United States Patent
Kosior

(10) Patent No.: US 8,969,425 B2
(45) Date of Patent: Mar. 3, 2015

(54) SEPARATION OF COMPONENTS OF PLASTIC

(71) Applicant: Nextek Limited, London (GB)

(72) Inventor: Edward Kosior, London (GB)

(73) Assignee: Nextek Limited, London (GB)

(*) Notice: Subject to any disclaimer, the term of this patent is extended or adjusted under 35 U.S.C. 154(b) by 0 days.

(21) Appl. No.: 13/774,130

(22) Filed: Feb. 22, 2013

(65) Prior Publication Data

US 2013/0231407 A1 Sep. 5, 2013

(30) Foreign Application Priority Data

Feb. 23, 2012 (GB) .................................. 1203154.8

(51) Int. Cl.
*C08J 11/04* (2006.01)
*C08J 11/06* (2006.01)
*B29B 17/02* (2006.01)
*B29K 27/06* (2006.01)
*B29K 67/00* (2006.01)

(52) U.S. Cl.
CPC ............... *C08J 11/06* (2013.01); *B29B 17/02* (2013.01); *C08J 2367/02* (2013.01); *B29K 2027/06* (2013.01); *B29K 2067/003* (2013.01); *B29B 2017/0203* (2013.01); *B29B 2017/0258* (2013.01)
USPC .............. 521/48; 521/40; 521/46.5; 528/480; 528/502 R; 528/503; 209/4; 209/11; 209/45; 209/46

(58) Field of Classification Search
CPC ....... C08J 11/06; C08J 2367/02; B29B 17/02; B29B 2017/0203; B29B 2017/0258; B29K 2027/06; B29K 2067/003
USPC ............... 521/40, 46.5, 48; 209/4, 11, 45, 46; 528/480, 502 R, 502 F, 503
See application file for complete search history.

(56) References Cited

U.S. PATENT DOCUMENTS

| 5,061,735 A | 10/1991 | Zielinski |
| 5,303,826 A | 4/1994 | Buzga |
| 2006/0281895 A1* | 12/2006 | Bohnert et al. ............... 528/480 |
| 2012/0157557 A1* | 6/2012 | Friedlaender .................. 521/48 |

FOREIGN PATENT DOCUMENTS

| FR | 2687083 A1 | 8/1993 |
| GB | 2 240 731 | * 8/1991 |
| GB | 2240731 A | 8/1991 |

* cited by examiner

*Primary Examiner* — Frances Tischler
(74) *Attorney, Agent, or Firm* — Barlow, Josephs & Holmes, Ltd.

(57) ABSTRACT

The present invention relates to a process for separating two or more components of a plastic material for the purposes of recycling, with particular application to purifying poly(ethylene terephthalate) (PET) during recycling procedures. The process comprises contacting a quantity of the plastic material with one or more discrete pre-heated particles.

20 Claims, 1 Drawing Sheet

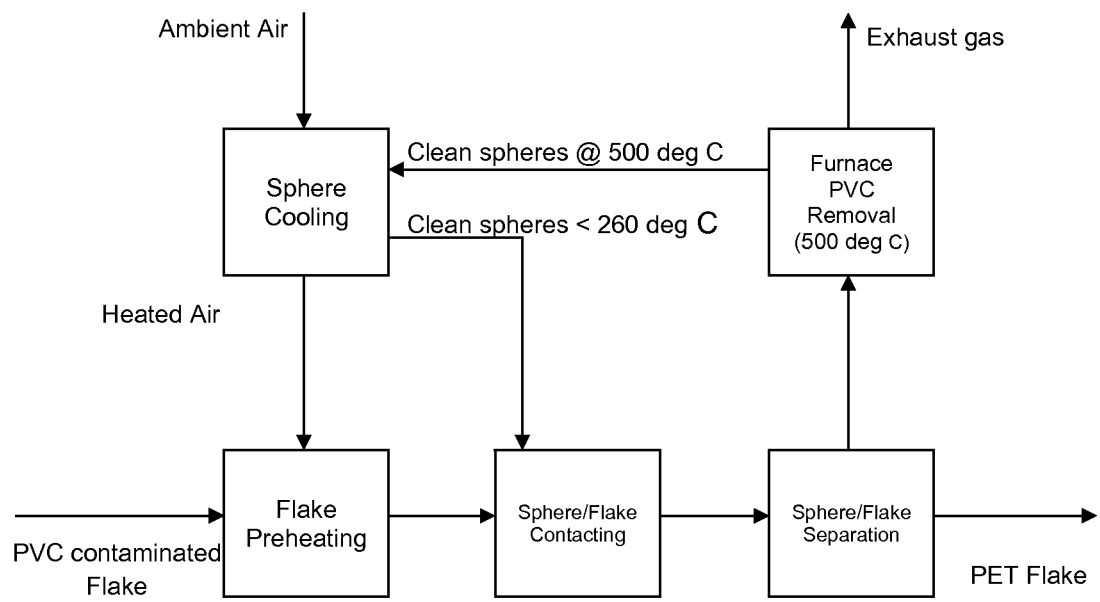

SEPARATION OF COMPONENTS OF PLASTIC

CROSS-REFERENCE TO RELATED APPLICATION

The present patent document claims priority to earlier filed GB Patent Application No. 1203154.8, filed on Feb. 23, 2012, the entire contents of which are incorporated herein by reference.

BACKGROUND OF THE INVENTION

1. Field of the Invention

The present invention relates to a process for separating two or more components of a plastic material for the purposes of recycling, with particular application to purifying poly (ethylene terephthalate) (PET) during recycling procedures.

2. Background of the Related Art

Recycling of waste products has become increasingly common in the last couple of decades, and the recycling of plastics is one of the most important and widely carried out with many industries and households around the world actively involved.

A multitude of everyday consumer items are made from plastics, such as bottles, bags and product packaging. Drinks bottles, for example, contain a number of different polymers. Separation of a post-consumer plastic waste stream into its unique constituent polymers so they can be subsequently re-used is the most difficult and expensive step of the recycling process.

For example, one such polymer which forms part of the plastics is poly(ethylene terephthalate), also known as PET. PET is the biggest volume post consumer plastic to be recycled worldwide with many plants in Europe and the USA being involved in its recycling, and with more plants being under construction or being planned in other parts of the world.

One vital aspect of PET recycling is the removal of other polymers such as poly(vinyl chloride) (PVC), polystyrene (PS), acrylonitrile butadiene styrene (ABS), or poly(lactic acid) (PLA), from the PET feed stream. However, a problem associated with this is the fact that the e.g. PVC degrades at PET extrusion temperatures. This results in a reduction of PET's intrinsic viscosity and causes discoloration of the PET. The removal of PVC is also difficult due to the similar densities of the two polymers.

One separation technique which has been employed uses spectroscopic sorters; however, this technology only has a limited level of accuracy in separating PET and PVC.

Another technique takes advantage of the relative properties of PVC and PET at elevated temperatures. PVC softens and becomes tacky when heated to about 200° C., whereas PET remains rigid up to about 260° C. The technique involves a stainless steel belt, onto which flakes of the plastic to be separated and purified are placed. The belt is heated up to about 200° C., and the PVC becomes tacky and sticks to the belt, separating the PVC impurity from the PET, which remains rigid.

However, this technique also has significant disadvantages. To remove the PVC from the steel belt, the belt then has to be continuously scraped or dismantled and the PVC which is stuck to the steel has to be cleaned off before the belt can be used again for a subsequent separation process. This is time consuming, costly, inefficient and inconvenient.

It would therefore be desirable to devise a process and an apparatus for the separation of constituents of a plastic material for plastic recycling which obviates the disadvantages of the existing processes detailed above.

SUMMARY OF THE INVENTION

The new technique of the invention offers a simple, efficient and robust alternative to, and improvement over, current technology, and is capable of achieving high separation efficiency.

Therefore, in accordance with the present invention, there is provided a process for the separation of two or more constituents of a plastic material, the process comprising contacting a quantity of the plastic material with one or more discrete pre-heated particles.

Typically, the process of the invention is of use as part of a process for the recycling of plastic.

According to one embodiment of the invention, one of the constituents of the plastic material is poly(ethylene terephthalate), and it is typically the PET which is to be separated from the other constituent components of the plastic material.

According to a further embodiment of the invention, one or more further constituents which may be present in the plastic material are selected from poly(vinyl chloride) (PVC), polystyrene (PS), acrylonitrile butadiene styrene (ABS), and poly (lactic acid) (PLA).

According to a further aspect of the invention, the plastic material is typically provided in the form of a flake when it is brought into contact with the pre-heated particles, although other forms of the plastic are of course envisaged within the scope of the invention and may be used in the process.

While it will be appreciated that the principle of the present invention will be applicable to the separation of any two or more materials in a plastic material, such as polymers, which have different thermal properties, for reasons of convenience the invention will be further explained with reference to the removal of contaminant components, such as PVC, from poly(ethylene terephthalate) for its purification.

The particles may be either metallic or non-metallic in nature. Exemplary, but non-limiting, materials which may be used include steel (typically stainless steel), alumina or silica (e.g. in the form of sand). Although particles of various different shapes may be employed in the process of the invention, the particles used are typically spherical particles due to their high relative surface area and also the ease with which they can be made to move into contact with the flakes and particles. The spheres may typically be from about 1 mm to about 50 mm in diameter, more typically from about 2 mm up to about 20 mm in diameter, and still more typically between about 3 mm and about 15 mm. However, the precise sizes and materials are not as important as long as the particles have a sufficient heat storage capacity.

The number of discrete particles used is dependent upon the surface area of the particles. The larger the particles, the less of them are required. For example, for a given batch size less than 50 particles may be used when steel particles having a diameter of about 12 mm are used, while when alumina particles having a diameter of about 3 mm are used, many more are typically required, such as from about 750 up to about 1500, or up to about 3000.

Another factor to be considered is the ratio of the respective volumes of the particles and flakes of material. The higher the ratio (i.e. the closer to 1:1 the ratio is), the better the results in terms of the amount of the contaminant material which is captured.

The particles are heated to a certain predetermined temperature, above which temperature the contaminant (e.g. PVC) changes its consistency and starts to melt, becoming sticky and adhering to the particles, but the temperature is kept below the temperature at which the principal component to be extracted via the separation (e.g. PET) would similarly adhere to the particles. Of course, the precise predetermined temperature can be deduced by a person skilled in the art depending upon the relative thermal properties of the components to be separated.

By way of example, in the case of the separation of PET and PVC, the particles are heated to a temperature above about 200° C., added to a flake mixture comprising PET and PVC, and tumbled in a rotating, baffled drum. The hot particles contact the PVC in the flakes and heats it to above about 200° C., causing adhesion of the PVC thereto. The PET in the flake remains rigid and does not adhere to the added particles. Separation of the PET flake from the agglomerations of the particles and PVC can then be effected based upon the difference in density of the particles in relation to the PET flakes.

The separation may also be carried out by sieving if the particles are larger than the average flakes, or alternatively by mechanical vibration on a device called a ballistic separator, or also by using a magnet if the particles are metallic in nature.

Such tests have shown that capture efficiencies of 100.0% were achieved in multiple trials, with PET losses below 1%. The critical time was less than 1 minute. The efficiency achieved was found to be dependent upon sphere heat capacity and density, sphere-flake volume ratio and initial flake temperature. The heat capacity ratio is the most important of these factors, i.e. that there is enough heat stored in the particles to melt the PVC particles they come into contact with.

The process of the invention typically also involves heating of the plastic material comprising the e.g. PET prior to contacting it with the particles as part of the process, as well as pre-heating the particles. Tests have shown that the capture efficiency of the PVC increases substantially linearly with increasing temperature of the plastic material.

Additionally, the minimum particle temperature required for adhesion of the PVC contaminant is reduced if the plastic material flakes are also heated. This is shown in Table 1, for example:

TABLE 1

| Sphere Type | Minimum Sphere Temperature for Adhesion (° C.) | |
| --- | --- | --- |
| | 20° C. Flake Temperature | 185° C. Flake Temperature |
| 12 mm steel spheres | 210 | 201 |
| 3 mm alumina spheres | 239 | 204 |

Alumina has a lower thermal conductivity than steel and thus will attach more slowly at lower temperatures.

The plastic material (PET and the target contaminant PVC) is typically pre-heated to at least about 100° C., more typically at least about 130° C., still more typically at least about 160° C., and most typically at least about 180° C.

Once the particles with the agglomerated PVC have been separated from the PET flakes, these particles are transferred to a furnace which provides a temperature of about 500° C. This removes the PVC from the particles as it is decomposed at such temperatures and burned off the particles. The particles are able to withstand such temperatures without any adverse effects.

The clean particles are then cooled to below about 260° C. using ambient air and can be transferred directly into another batch of plastic material to be reused in further separation processes.

The process of the invention may be carried out either as a batch process or as a continuous process.

It is envisaged that the present invention may be used by a range of companies which are involved in the processing of plastics comprising primary components (such as PET) prior to extrusion or melting, such as recycling companies that have residual PVC (or other plastics components), and sheet extrusion companies where flake is bought to be used in the mid layer or about to be processed by an extruder for food grade approval.

According to one embodiment of the invention, the process can be run off-line, allowing for flexibility and the opportunity to check the quality of the final product, or it can be run in-line as a final quality assurance step to further purify the in-feed primary components (such as PET) prior to extrusion.

According to a further aspect of the invention, there is provided an apparatus for carrying out the process as described hereinabove. The apparatus may either be a separate stand-alone device or may be part of an integral machine with a drier, typically an infrared drier.

The apparatus may typically comprise a removable component, such as a tray or the like, upon which the separation process takes place. This component is intended to be able to be easily removable from the apparatus and is not permanently affixed thereto. This allows the problems associated with existing processes to be avoided. Specifically, the apparatus will not have a continuous belt, which must either be continuously scraped or dismantled in order to remove any PVC stuck to the belt before the belt can be used again for a subsequent separation process. The removable tray enables a subsequent separation process to be carried out immediately, as one tray is simply replaced by another and the process can continue.

According to a further aspect of the invention, there is provided a use of one or more discrete pre-heated particles in the separation of two or more constituents of a plastic material for plastic recycling.

BRIEF DESCRIPTION OF THE DRAWING

The invention will now be described further by way of example with reference to the following FIGURE which is intended to be illustrative only and in no way limiting upon the scope of the invention.

FIG. 1 shows a flow diagram illustrating the overall separation process driven by the invention.

DESCRIPTION OF THE PREFERRED EMBODIMENT

The PVC contaminated flake is pre-heated before being contacted with the spherical particles which have themselves been pre-heated to a suitable temperature. Under exposure to this temperature the PVC becomes sticky in texture and adheres to the particles. The PET flakes are then separated from the particles with the agglomerations of PVC thereon using the difference in their relative densities. The particles with the agglomerations of PVC are then transferred into a furnace heated to about 500° C. to remove the PVC from the particles. The clean spheres are allowed to cool under ambient air from 500° C. to below about 260° C. The heated air from the cooling process is used to pre-heat a new batch of the PVC contaminated flakes before the flakes are contacted with the cooled particles to begin the process once more.

Tests have shown that substantially linear plots can be obtained for the efficiency of the particles in capturing the contaminant (on a mass basis) against the pre-heated temperature of the flakes (at 20° C., 135° C. and 185° C.). As the pre-heated temperature of the flakes is increased, the capture efficiency also increases, both for when nineteen 12.5 mm steel sphere particles or 1500 3 mm alumina sphere particles are used in the process.

The higher the initial temperature to which the particles are pre-heated, causes a higher thermal heat capacity of the particles when they are added to the flakes, which in turn increases the capture efficiency of the particles for the contaminant up to 100% for both 12.5 mm steel sphere particles and 3 mm alumina sphere particles.

Another means of analysing the capture efficiency of the contaminant for the particles is what is termed the Heat Capacity Ratio (HCR). The HCR is calculated as follows:

$$HCR = \frac{\text{Heat stored in particle above contaminant adhesion temperature}}{\text{Heat required to heat flake mix to contaminant adhesion temperature}}$$

If the particles are not pre-heated, the HCR value is typically low (i.e. less than 2), as is the capture efficiency of the particles for the contaminant. A higher HCR value is obtained by pre-heating the particles to about 135° C., which also has the effect of increasing the capture efficiency of the particles for the contaminant. Further increasing the pre-heat temperature of the particles to about 185° C. increases the HCR value still further (to about 13-14) and also results in a still higher capture efficiency of the particles for the contaminant of near 100%. These relationships apply equally for either 12.5 mm steel sphere particles or 3 mm alumina sphere particles.

A number of results showing the capture efficiency and amount of PET lost for particles having different sizes and numbers and initial temperatures are shown in Table 2.

The process does not require the belt removal and cleaning currently carried out in existing techniques, and the particles are easy to recycle for reuse in another separation process.

It is of course to be understood that the present invention is not intended to be restricted to the foregoing examples which are described by way of example only.

What is claimed is:

1. A process for the separation of a first component of a plastic material from a second component of a plastic material, the process comprising the steps of:
    pre-heating a plurality of discrete contacting particles separate from the plastic material; and
    contacting a quantity of the plastic material with said plurality of discrete pre-heated contacting particles, wherein the particles are pre-heated to a temperature above a melting temperature of said first component of said plastic material, but below said melting temperature of said second component of said plastic material, whereby following contact of said plastic material with said pre-heated particles said first component melts and adheres to said particles thereby providing for separation of said first component from the plastic material.

2. The process according to claim 1, wherein one of the components in the plastic material is poly(ethylene terephthalate) (PET).

3. The process according to claim 2, wherein one or more further components of the plastic material are selected from poly(vinyl chloride) (PVC), polystyrene (PS), acrylonitrile butadiene styrene (ABS), and poly(lactic acid) (PLA).

4. The process according to claim 1, wherein the components in the plastic material to be separated are PET and PVC.

5. The process according to claim 4, wherein the particles are pre-heated to at least about 200° C.

6. The process according to claim 1, wherein the particles are substantially spherical in shape.

TABLE 2

| $3^{rd}$ Particle Type | $3^{rd}$ Particle Size (mm) | $3^{rd}$ Particle No. | Drum Insulation | Final Mix Temp (° C.) | Mass Ratio PET/PVC in Flake Mix | Avg. PVC Flake Mass Ratio (Adhered/Non Adhered) | Capture Efficiency (Mass Basis) | PET Loss (% of Total PET) | No. Attached $3^{rd}$ Particles per Adhered PVC Flake | No. Attached $3^{rd}$ Particles per Adhered PET Flake |
|---|---|---|---|---|---|---|---|---|---|---|
| AS | 3 | 3000 | Y | 152 | 23.3 | 1.05 | 61.6% | 1.2% | 0.5 | — |
| AS | 3 | 750 | Y | 104 | 24.0 | 1.00 | 60.5% | 4.6% | 7.9 | — |
| SS | 12 | 19 | Y | 129 | 20.0 | 0.70 | 85.0% | 4.3% | 0.3 | — |
| AS | 3 | 3000 | Y | 141 | 24.0 | 0.84 | 89.2% | 0.4% | 10.4 | 1.2 |
| AS | 3 | 1500 | Y | 145 | 24.8 | — | 100.0% | 0.5% | 8.7 | 1.8 |
| AS | 3 | 3000 | Y | 166 | 24.0 | — | 100.0% | 0.7% | 9.5 | 1.0 |
| SS | 12 | 19 | Y | 148 | 24.0 | 0.90 | 97.0% | 1.9% | 0.5 | — |
| AS | 3 | 1500 | Y | 130 | 27.0 | 1.12 | 75.7% | 0.2% | 3.5 | 1.0 |
| AS | 3 | 750 | Y | 115 | 26.7 | 1.18 | 80.0% | 0.1% | 5.2 | 1.0 |
| SS | 12 | 38 | Y | 102 | 24.7 | 0.64 | 55.6% | 0.4% | 0.8 | — |
| AS | 3 | 3000 | Y | 199 | 24.8 | 1.68 | 93.2% | 0.9% | 9.3 | 1.2 |
| AS | 3 | 1500 | Y | 184 | 23.8 | — | 100.0% | 0.7% | 8.7 | 1.1 |
| SS | 12 | 38 | Y | 176 | 23.3 | 1.13 | 98.3% | 6.3% | 0.6 | — |
| SS | 12 | 38 | Y | 142 | 22.5 | 0.86 | 92.7% | 0.4% | 0.5 | — |
| SS | 12 | 38 | Y | 200 | 25.0 | 3.90 | 98.8% | 5.3% | 0.7 | — |

It can be seen that a number of the examples are able to achieve a capture efficiency of 100.0% of the PVC contaminant, while many others have capture efficiency values above 90%, while at the same time minimising the loss of PET in the process to less than 1%. Such advantageous efficiency can be achieved by using either the ½ inch steel sphere particles or the ⅛ inch alumina sphere particles.

In summary, the process of the invention provides for a rapid, selective and consistent adhesion of a contaminant, such as PVC, to the particles, and is able to achieve 100.0% contaminant removal efficiency with minimal loss of PET.

7. The process according to claim 6, wherein the particles are between about 2 mm and about 15 mm in diameter.

8. The process according to claim 1, wherein the particles are selected from the group consisting of: metallic, non-metallic and combinations thereof.

9. The process according to claim 8, wherein the particles comprise stainless steel and/or alumina.

10. The process according to claim 1, wherein the plastic material is also heated prior to contacting the particles.

11. The process according to claim 10, wherein the plastic material is pre-heated to at least about 180° C.

12. The process according to claim 1, wherein the plastic material is provided in the form of a flake when it is brought into contact with the pre-heated particles.

13. The process according to claim 1, wherein the process can be carried out as a batch process or as a continuous process.

14. The process according to claim 1, wherein the process can be used as part of a plastic recycling process.

15. The process according to claim 1, wherein the particles are metallic or silica.

16. The process according to claim 12, wherein the plastic material is also heated prior to contacting the particles.

17. The process according to claim 16, wherein particles are metallic or silica.

18. The process according to claim 16, wherein the particles are substantially spherical in shape.

19. The process according to claim 17, wherein the particles are substantially spherical in shape.

20. The process according to claim 12, wherein the ratio of the respective volumes of the particles and flake plastic material is up to about 1:1.

* * * * *